L. WALKER.
Improvement in Cultivators.

No. 115,138.    Patented May 23, 1871.

Witnesses:

Inventor:
L. Walker.

PER

Attorneys.

UNITED STATES PATENT OFFICE.

LEANDER WALKER, OF VICTORIA, TEXAS.

IMPROVEMENT IN CULTIVATORS.

Specification forming part of Letters Patent No. 115,138, dated May 23, 1871.

*To all whom it may concern:*

Be it known that I, LEANDER WALKER, of Victoria, in the county of Victoria and in the State of Texas, have invented a new and useful Improvement in Cultivator; and I do hereby declare that the following is a full, clear, and exact description thereof, which will enable others skilled in the art to make and use the same, reference being had to the accompanying drawing forming part of this specification, in which—

Figure 1:
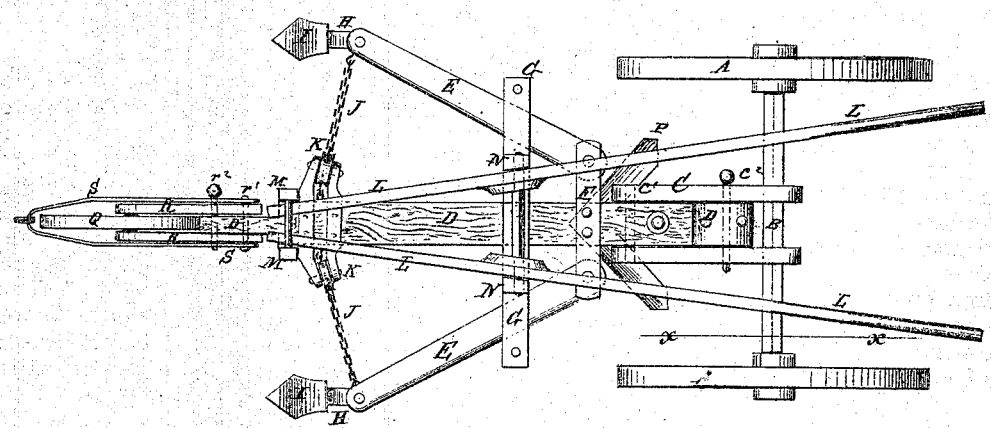
Figure 2:
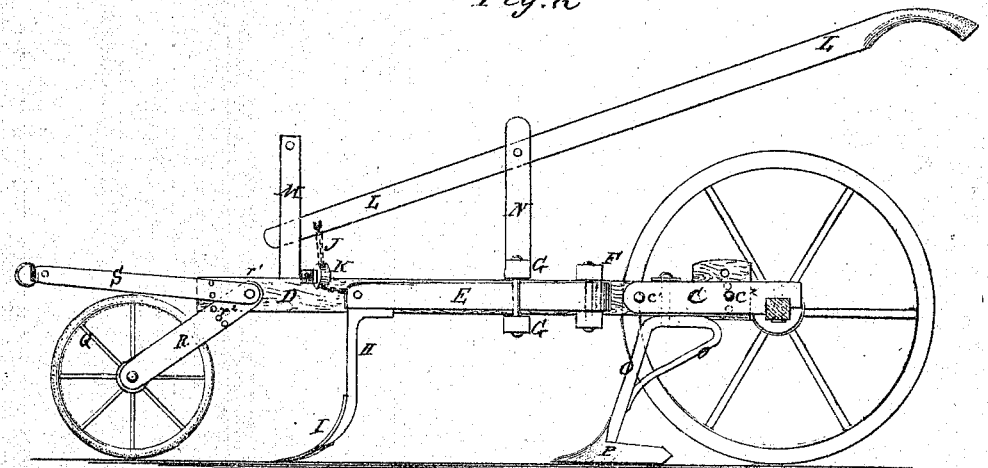

Figure 1 is a top view of my improved cultivator. Fig. 2 is a side view of the same, partly in section, through the line $x\ x$, Fig. 1.

Similar letters of reference indicate corresponding parts.

My invention has for its object to furnish an improved cultivator, simple in construction, effective in operation, of light draft, and easily controlled to adjust its width to the varying distance between the rows of plants being cultivated; and it consists in the combination of certain parts, which are hereinafter described, in connection with others necessary to form the complete machine.

A are the rear wheels of the cultivator, which revolve upon the journals of the axle B. To the middle part of the axle B are securely attached the rear ends of two short bars or blocks, C, said bars or blocks being placed at such a distance apart as to receive between their forward ends the rear end of the beam D, which is secured in place by two bolts, $c^1\ c^2$, the forward bolt $c^1$ passing through the beam D and the forward end of the bars or blocks C. The rear bolt $c^2$ passes through a hole in the bars or blocks C, and through one or the other of the holes in the rear end of the beam D, the rear end of said beam D being extended vertically, or made with a vertical cross-head, and having several holes formed in it to receive the bolt $c^2$, so that by adjusting the position of the bolt $c^2$ the depth at which the plows work in the ground may be regulated at will. E are the side beams, which are made short, and the rear ends of which are pivoted to and between the two ends of short cross-bars, F, securely attached to the beam D, just in front of the bars or blocks C. When the machine is to be used as a harrow the pivoting-bolts may be replaced by the shanks or standards of harrow or cultivator teeth. The side beams E pass between the projecting ends of two longer cross-bars, G, attached to the beam D in front of the shorter cross-bars F, where their lateral movement may be limited by bolts passing through and connecting the said cross-bars G. To the forward ends of the side beams E are attached the upper ends of the standards H, to the lower ends of which are attached the cultivator plows or teeth I. To the forward ends of the side beams E are attached the ends of the chain J, which pass around pulleys K, pivoted to the forward part of the beam D, and their other ends are attached to the forward ends of the handles L, which move up and down between, and are kept in position by the uprights M, attached to the beam D, just in front of the pulleys K. The handles L are pivoted to standards N attached to the cross-bars G. By this construction, by bearing down upon the rear ends of the handles L, either or both, the forward plows, either or both, will be drawn inward to accommodate the width of the machine to the narrower distance between the rows of plants, or to avoid irregular hills. As soon as the pressure upon the handle or handles is removed the forward plows will be forced outward by the resistance of the soil, the draft strain upon the said plows being sustained by the chains J. To the rear part of the beam D is attached the upper part of the standard O. The standard O is bent to the rearward, so as to lie along and be secured to the under side of the beam D. It is then bent downward and forward, and its end is secured to the body of said standard, so as to serve as a brace to strengthen it against the draft strain. To the lower end of the standard O is attached the cultivator plow or tooth P, the sides or wings of which should extend sufficiently to act upon all the soil left unacted upon between the forward plows. When the machine is to be used as a harrow the plow O P should be removed. The forward end of the machine is supported by the wheel Q, which is pivoted to and between the forward ends of the bars R. The rear ends of the bars R are pivoted to the sides of the forward end of the beam D by a bolt, $r^1$. The rear ends of the bars R are also secured to the forward end of the beam D by a pin or bolt, $r^2$, which passes through one or the other of the holes in the bars R, and through one or the other of the holes through the forward end of the beam D, so that the wheel Q may be adjusted to cause the plows to work deeper or shallower in the ground by simply adjusting the position of the pin or bolt $r^2$. The draft is attached to the clevis S, the arms of which are made so long as to pass back upon each side of the wheel Q, and their ends are pivoted to the forward end of the beam D. The pin or bolt $r^2$ is made so long that its ends may project beyond the arms of the clevis S, so that the said clevis may hold the forward end of the machine down and thus steady it.

Having thus described my invention, I claim as new and desire to secure by Letters Patent—

The combination of the pivoted side beams E, to which the forward plows H I are attached, chains J, pulleys K, and pivoted handles L, with each other and with the beam D, substantially as herein shown and described, and for the purpose set forth.

LEANDER WALKER.

Witnesses:
H. S. CUNNINGHAM,
E. W. GAYLORD.